(12) United States Patent
Iwasa et al.

(10) Patent No.: US 8,804,245 B2
(45) Date of Patent: Aug. 12, 2014

(54) STACKED DIFFRACTION OPTICAL ELEMENT INCLUDING AN OPTICAL ELEMENT MADE OF ORGANIC-INORGANIC COMPOSITE RESIN MATERIAL

(75) Inventors: Hidefumi Iwasa, Yokohama (JP); Hideo Ukuda, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 122 days.

(21) Appl. No.: 13/355,939

(22) Filed: Jan. 23, 2012

(65) Prior Publication Data
US 2012/0200925 A1 Aug. 9, 2012

(30) Foreign Application Priority Data
Feb. 3, 2011 (JP) ................... 2011-021741

(51) Int. Cl.
*G02B 5/18* (2006.01)
*G02B 1/04* (2006.01)
*G02B 27/00* (2006.01)

(52) U.S. Cl.
CPC ............... *G02B 5/1819* (2013.01); *G02B 1/04* (2013.01); *G02B 5/1823* (2013.01); *G02B 5/1866* (2013.01); *G02B 5/1852* (2013.01); *G02B 27/0056* (2013.01)
USPC ............................ 359/576; 359/566; 359/571

(58) Field of Classification Search
None
See application file for complete search history.

(56) References Cited

U.S. PATENT DOCUMENTS

| 5,847,877 | A | 12/1998 | Imamura et al. |
| 6,262,846 | B1 | 7/2001 | Nakai et al. |
| 7,031,078 | B2 | 4/2006 | Ukuda |
| 7,663,803 | B2 | 2/2010 | Ukuda et al. |
| 8,124,324 | B2 | 2/2012 | Iwasa |
| 2004/0051949 | A1* | 3/2004 | Ukuda .......................... 359/576 |
| 2009/0180186 | A1 | 7/2009 | Ando et al. |
| 2009/0190224 | A1 | 7/2009 | Iwasa et al. |
| 2009/0231712 | A1 | 9/2009 | Ushigome |
| 2010/0076138 | A1 | 3/2010 | Iwasa |

FOREIGN PATENT DOCUMENTS

| EP | 1 394 574 A2 | 3/2004 |
| EP | 1 591 806 A1 | 11/2005 |
| JP | 2006-276195 | * 10/2006 |
| JP | 2009-197217 A | 9/2009 |

OTHER PUBLICATIONS

Extended European Search Report in Application No. 12000674.7 (Apr. 27, 2012).
Office Action in Chinese Application No. 201210023593.4 (dated Dec. 11, 2013).

* cited by examiner

*Primary Examiner* — Martin Angebranndt
(74) *Attorney, Agent, or Firm* — Fitzpatrick, Cella, Harper & Scinto

(57) ABSTRACT

Provided are an organic-inorganic composite resin composition and an organic-inorganic composite resin material made of a cured product thereof, containing at least an organic compound having a polymerizable functional group, metal oxide fine particles, and a polymerization initiator. The cured product obtained by curing the organic-inorganic composite resin composition through application of an active energy has a refractive index nd of 1.61 or more and 1.65 or less, Abbe's number vd of 13 or more and 20 or less, and an anomalous dispersion characteristic θg,F of 0.42 or more and 0.54 or less. Further provided is an optical element comprising a transparent substrate and the organic-inorganic composite resin material formed on the transparent substrate.

7 Claims, 6 Drawing Sheets

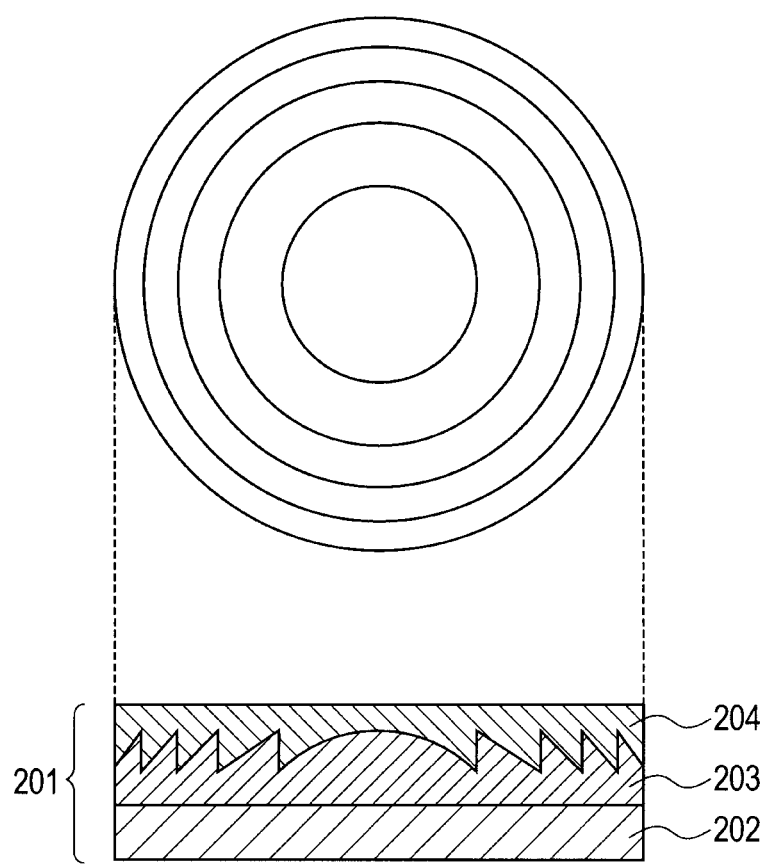

STACKED DIFFRACTION OPTICAL ELEMENT INCLUDING AN OPTICAL ELEMENT MADE OF ORGANIC-INORGANIC COMPOSITE RESIN MATERIAL

BACKGROUND OF THE INVENTION

1. Field of the Invention

The present invention relates to an organic-inorganic composite resin composition, an organic-inorganic composite resin material, an optical element, and a stacked diffraction optical element. In particular, the present invention relates to an optical element used for an imaging optical system such as a camera.

2. Description of the Related Art

Conventionally, in a refracting optical system using refraction of light, lenses made of glass materials having different dispersion characteristics are combined so as to reduce chromatic aberration. For instance, in an objective lens of a telescope or the like, a glass material having small dispersion is used for a positive lens, while a glass material having large dispersion is used for a negative lens, and those lenses are combined for correcting chromatic aberration occurring on axis. However, if a structure or the number of lenses is limited, or if glass materials to be used are limited, it may be difficult to achieve sufficient correction of chromatic aberration.

Therefore, it is known that the use of combination of a refractive optical element having a refracting surface and a diffraction optical element having a diffraction grating can suppress chromatic aberration with a small number of lenses.

This utilizes a physical phenomenon that the direction of generating chromatic aberration in a light beam having a reference wavelength is opposite between a diffracting surface and the refracting surface as an optical element. In addition, by changing a period of the diffraction grating formed on the diffraction optical element in a continuous manner, an equivalent characteristic to a characteristic of an aspheric lens can be obtained.

However, one light beam entering the diffraction optical element is split into multiple light beams having different orders by the diffraction action. In this case, diffracted light beams having other orders than the design order may form images at positions different from a position of image formation by the light beam of the design order and become a factor of generation of flare.

U.S. Pat. Nos. 5,847,877 and 6,262,846 disclose that, by optimizing refractive index dispersion of each optical element and a shape of grating formed on an interface of an optical element, high diffraction efficiency can be achieved in a wide wavelength range. By concentrating light beams in a used wavelength region into a predetermined order (hereinafter, referred to as a design order), intensities of diffracted light beams of the other diffraction orders are controlled to be low so as to suppress generation of flare.

Specifically, U.S. Pat. No. 5,847,877 describes use of BMS81 (nd=1.64, vd=60.1, manufactured by OHARA Inc.) and plastic optical material PC (nd=1.58, vd=30.5, manufactured by Teijin Chemicals Ltd.). In addition, U.S. Pat. No. 6,262,846 describes use of COO1 (nd=1.52, vd=50.8, manufactured by DIC Corporation), plastic optical material PC (nd=1.58, vd=30.5, manufactured by Teijin Chemicals Ltd.), BMS81 (nd=1.64, vd=60.1, manufactured by OHARA Inc.), and the like.

Note that, Abbe's number (vd) is calculated by the following equation (1).

$$vd=(nd-1)/(nF-nC) \quad (1)$$

Here, nd denotes refractive index on d-line (587.6 nm), nF denotes refractive index on F-line (486.1 nm), and nC denotes refractive index on C-line (656.3 nm).

The inventors of the present invention have studied optical materials that are available in the market or are under research and development as optical materials of the diffraction optical element, and have obtained distribution graphs as illustrated in FIGS. 2A and 2B. FIG. 2A is a graph illustrating a distribution of Abbe's numbers and refractive indexes of general optical materials. FIG. 2B is a graph illustrating a distribution of Abbe's numbers and anomalous dispersion characteristics of general optical materials. Materials of stacked diffraction optical elements described in U.S. Pat. Nos. 5,847,877 and 6,262,846 are also included in the distributions of FIGS. 2A and 2B.

In addition, U.S. Pat. No. 5,847,877 also discloses use of combination of a diffraction optical element made of a material having relatively low refractive index dispersion and a diffraction optical element made of a material having high refractive index dispersion, in order to obtain a structure having high diffraction efficiency in a wide wavelength range.

In other words, as a difference of the refractive index dispersion becomes larger between a material having high refractive index dispersion and a material having low refractive index dispersion, the diffraction efficiency of the constituted optical element becomes higher and hence a field angle of the optical element becomes wider. Therefore, in order to correct the chromatic aberration with high accuracy, it is required to use a material having higher refractive index dispersion (small Abbe's number) and lower refractive index dispersion (large Abbe's number).

U.S. Pat. No. 7,031,078 discloses an optical material having a relationship between the refractive index (nd) and the Abbe's number (vd) satisfying nd>−6.667×10−3vd+1.70, and a relationship between anomalous dispersion characteristic (θg,F) of the refractive index and the Abbe's number (vd) satisfying θg,F-≤−2vd×10−3+0.59. By satisfying these equations, the diffraction efficiency can be improved in the entire visible light region.

Note that, the anomalous dispersion characteristic (θg,F) of the refractive index is calculated by the following equation (2).

$$\theta g,F=(ng-nF)/(nF-nC) \quad (2)$$

Here, ng denotes a refractive index on g-line (435.8 nm), nd denotes a refractive index on d-line (587.6 nm), nF denotes a refractive index on F-line (486.1 nm), and nC denotes a refractive index on C-line (656.3 nm).

In the optical material disclosed in U.S. Pat. No. 7,031,078, as a transparent conductive metal oxide having high refractive index dispersion and low anomalous dispersion characteristic, ITO, ATO, or $SnO_2$ is exemplified.

U.S. Pat. No. 7,663,803 and Japanese Patent Application Laid-Open No. 2009-197217 specifically disclose use of combination of a diffraction optical element made of a material containing metal oxide fine particles such as ITO as the material having high refractive index dispersion and a diffraction optical element made of a material containing metal oxide fine particles such as $ZrO_2$ as the material having low refractive index dispersion.

A typical general structure of the stacked diffraction optical element disclosed in U.S. Pat. No. 7,663,803 is described with reference to FIG. 3. FIG. 3 is a schematic diagram of a stacked diffraction optical element 201. The upper part of FIG. 3 illustrates a top view, and the lower part of FIG. 3 illustrates a cross sectional view. This stacked diffraction optical element has a structure including a transparent substrate layer 202 made of glass or plastic material, on which a layer 203 having a diffraction grating shape and high-refractive index low-dispersion characteristic, and a layer 204 having low-refractive index high-dispersion characteristic are stacked without space between them. Note that, the order of stacking the layer 203 having high-refractive index low-dispersion characteristic and the layer 204 having low-refractive index high-dispersion characteristic may be reversed. In addition, each side of the transparent substrate layer 202 may be a flat surface, a spherical shape, or an aspheric shape. In addition, both the layer 203 having high-refractive index low-dispersion characteristic and the layer 204 having low-refractive index high-dispersion characteristic may be sandwiched between transparent substrate layers.

As for a structure of the stacked diffraction optical element, if the stacked diffraction optical element is used for various lens systems, the height of the grating must be lower. For instance, if the stacked diffraction optical element is used for a wide-angle lens, components of light entering the grating obliquely increase because of the wide field angle. In other words, as the height of the grating is higher, a ratio of blocking of the incident light caused by the grating wall surface increases, and hence an amount of flare increases.

In order to reduce the height of the grating, refractive index characteristics, in addition to refractive index dispersion characteristics, of the materials forming the two diffraction optical elements have a large influence. As a difference of refractive index between two diffraction optical elements is larger, the height of the grating can be designed lower. Thus, an amount of generated flare of the grating wall surface depending on the height of the grating can be reduced.

The diffraction optical element formed by using the optical material described in U.S. Pat. No. 7,663,803 has high diffraction efficiency of 99% or higher in the visible light region, and the height of the grating is 7.3 µm or more. As a result, the reduction of flare depending on the height of the grating is not sufficient.

In addition, as to the material described in U.S. Pat. No. 7,663,803, in order to further reduce the height of the grating, it is conceivable that increasing amounts of fine particles causes the refractive index dispersion characteristic to change. However, if additive amounts of fine particles increase, it becomes difficult to produce the material because of a problem of viscosity. In addition, it is expected that use in an optical system becomes difficult because of an increase of dispersion. In addition, because a dispersant is relatively increased, it becomes difficult to obtain desired optical characteristics.

Therefore, in the conventional technologies, no material that can be designed to reduce the height of the grating while maintaining high diffraction efficiency in a visible light region has been found.

SUMMARY OF THE INVENTION

The present invention has been made in view of the above-mentioned related art, and an object thereof is to provide an organic-inorganic composite resin composition and an organic-inorganic composite resin material, which are used for manufacturing an optical element that has high diffraction efficiency in the visible light region, can reduce the height of the grating, and thus has a reduced amount of generated flare.

In addition, another object of the present invention is to provide an optical element and a stacked diffraction optical element that have high diffraction efficiency in the visible light region, can reduce the height of the grating, and thus have a reduced amount of generated flare.

In order to solve the above-mentioned problem, an organic-inorganic composite resin composition including at least: an organic compound having a polymerizable functional group; metal oxide fine particles; and a polymerization initiator, in which a cured product obtained by curing the organic-inorganic composite resin composition through application of an active energy has a refractive index nd of 1.61 or more and 1.65 or less, Abbe's number vd of 13 or more and 20 or less, and an anomalous dispersion characteristic $\theta g,F$ of 0.42 or more and 0.54 or less.

In order to solve the above-mentioned problem, an organic-inorganic composite resin material is made of the cured product of the above-mentioned organic-inorganic composite resin composition.

In order to solve the above-mentioned problem, an optical element includes a transparent substrate, and the above-mentioned organic-inorganic composite resin material formed on the transparent substrate.

In order to solve the above-mentioned problem, a stacked diffraction optical element includes: a first diffraction optical element that is made of the above-mentioned organic-inorganic composite resin material, and has one surface thereof being a diffracting surface having a diffraction shape; and a second diffraction optical element that is made of glass having a larger refractive index and a larger Abbe's number than a refractive index and Abbe's number of the first diffraction optical element, and has one surface thereof being a diffracting surface having a diffraction shape, in which the first diffraction optical element and the second diffraction optical element are disposed so that the diffracting surfaces thereof are opposed to each other and are in close contact with each other.

According to the present invention, it is possible to provide an organic-inorganic composite resin composition and an organic-inorganic composite resin material which are used for manufacturing an optical element that has high diffraction efficiency in the visible light region can reduce the height of the grating, and thus a reduced amount of generated flare.

In addition, according to the present invention, it is possible to provide an optical element and a stacked diffraction optical element that have high diffraction efficiency in the visible light region, can reduce the height of the grating, and thus have a reduced amount of generated flare.

Further features of the present invention will become apparent from the following description of exemplary embodiments with reference to the attached drawings.

BRIEF DESCRIPTION OF THE DRAWINGS

FIG. 3 is a schematic diagram illustrating a conventional stacked diffraction optical element.

DESCRIPTION OF THE EMBODIMENT

Figure 1:
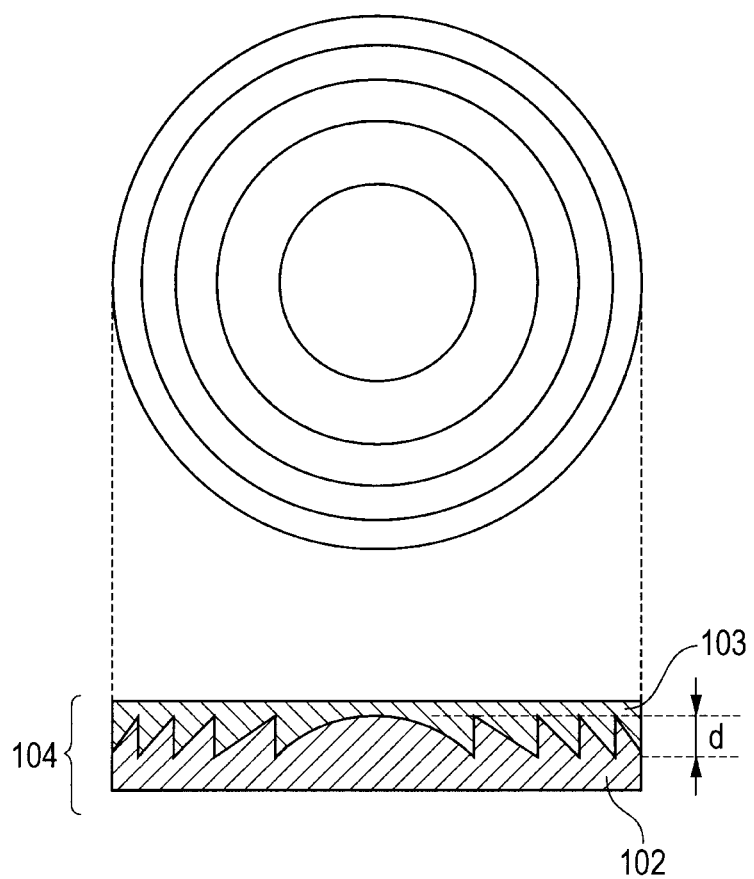
FIG. 1 is a schematic diagram illustrating an embodiment of a stacked diffraction optical element according to the present invention.
Figure 2A:
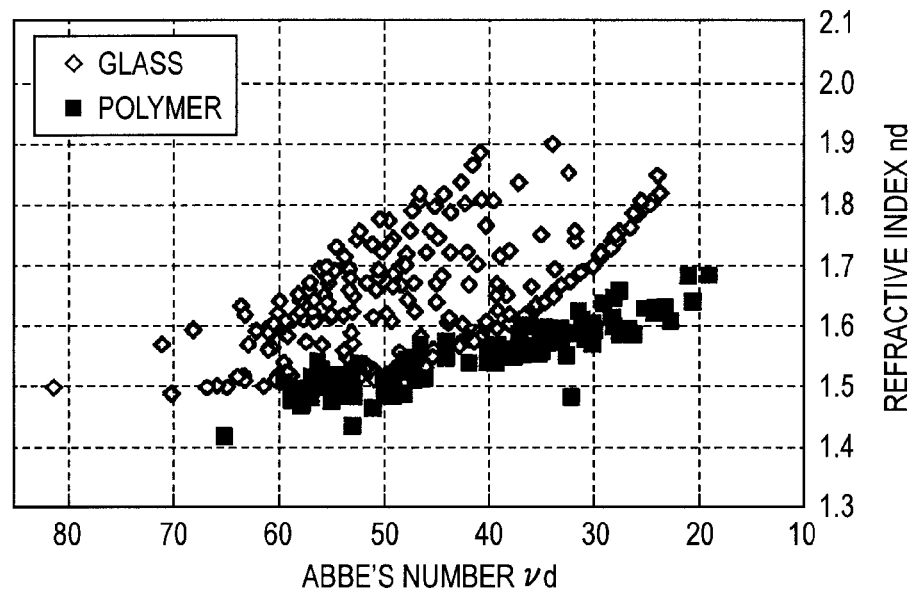
FIG. 2A is a graph illustrating a distribution of Abbe's numbers and refractive indexes of general optical materials.
Figure 2B:
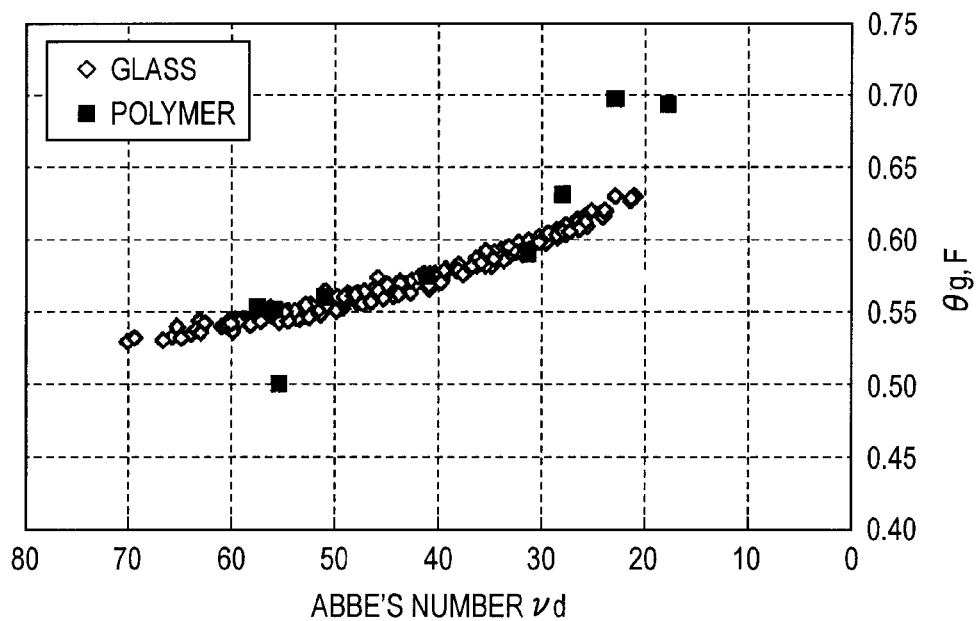
FIG. 2B is a graph illustrating a distribution of Abbe's numbers and anomalous dispersion characteristics of general optical materials.

Hereinafter, an embodiment of the present invention is described in detail.

An organic-inorganic composite resin composition according to the present invention contains at least an organic compound having a polymerizable functional group in molecules, metal oxide fine particles, and a polymerization initiator, and has a feature that a value of a refractive index nd, Abbe's number νd, and anomalous dispersion characteristic θg,F of a cured product in which the organic-inorganic composite resin composition is cured by applying an active energy, are in the ranges described below.

The refractive index nd is preferably 1.61 or more and 1.65 or less, and is more preferably 1.62 or more and 1.64 or less.

The Abbe's number νd is preferably 13 or more and 20 or less, and is more preferably 14 or more and 19 or less.

The anomalous dispersion characteristic θg,F is preferably 0.42 or more and 0.54 or less, and is more preferably 0.43 or more and 0.52 or less.

The organic-inorganic composite resin material of the present invention is made of the cured product of the above-mentioned organic-inorganic composite resin composition and is used as an optical material.

An optical element according to the present invention includes a transparent substrate, and the above-mentioned organic-inorganic composite resin material formed on the transparent substrate.

Hereinafter, each component for forming the organic-inorganic composite resin composition of the present invention is described.

(Organic Compound)

An organic compound for forming the organic-inorganic composite resin composition of the present invention is preferably a compound containing a group having a sulfur atom and a polymerizable functional group. As the polymerizable functional group, the compound preferably contains at least one kind of an acrylic group, a methacrylic group, a vinyl group, and an epoxy group. As the group having a sulfur atom, the compound preferably contains at least one kind of a sulfide group, a sulfone group, a sulfoxide group, a thiol (mercaptan) group, and a thioester group.

Specific examples of the organic compound to be used in the present invention include bis(4-vinylthiophenyl)sulfide, bis(4-styrenyl)sulfide, bis(4-acryloylthiophenyl)sulfide, bis(4-methacryloylthiophenyl)sulfide, bis(4-acryloxyethylthiophenyl)sulfone, bis(4-methacryloxyethylthiophenyl)sulfone, bis(9-vinyloxyethylthiophenyl)sulfone, bis(4-acryloylthioethylthiophenyl)sulfone, bis(9-methacryloylthioethylthiophenyl)sulfone, and bis(4-vinylthioethylthiophenyl)sulfone. The organic compound may not only be any one of the monomers as a monomer but also be any one of the oligomers and polymers thereof. Suitable examples thereof include HV153 (manufactured by ADELL CORPORATION) of the OPTOKLEB series, UV1000 (manufactured by Mitsubishi Chemical Corporation), and MPSMA and MPV (manufactured by Sumitomo Seika Chemicals Company Limited). Only one kind of the organic compounds may be used, or two or more kinds thereof may be used in combination in accordance with, for example, curability and refractive index characteristics.

In addition, the organic compound for forming the organic-inorganic composite resin composition of the present invention is preferably a compound containing a fluorene group and a polymerizable functional group. The compound preferably contains at least one kind of an acrylic group, a methacrylic group, a vinyl group, and an epoxy group as the polymerizable functional group.

Specific examples of the organic compound containing a fluorene group and the polymerizable functional group include compounds each represented by the following chemical formula (I).

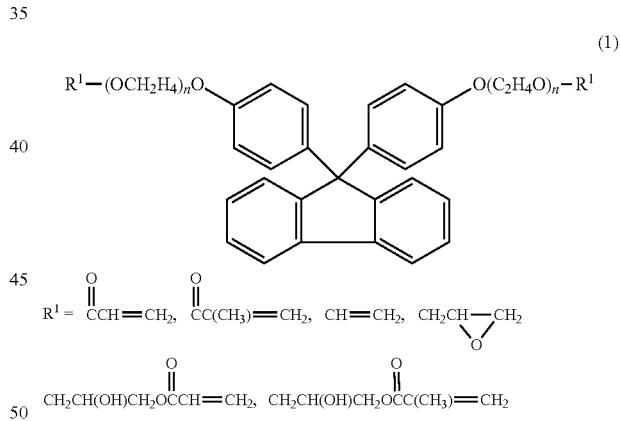

n represents 1 to 5.

In particular, the organic compound is more preferably 9,9-bis[4-(2-acryloyloxyethoxy)phenyl]fluorene having an acrylic group at $R^1$ in terms of refractive index characteristics and curability. The organic compound may not only be any one of the monomers as a monomer but also be any one of the oligomers and polymers thereof. Suitable examples thereof include an EA-0200, EA-0500, EA-1000, EA-F5003, EA-F5503, PG, PG-100, EG, and EG-210 of an OGSOL series (manufactured by Osaka Gas Chemicals Co., Ltd.). Only one kind of the organic compounds may be used, or two or more kinds thereof may be used in combination in accordance with, for example, curability and refractive index characteristics.

As for the refractive index characteristics of a cured product of the organic compound, the refractive index nd is preferably 1.55 or more and 1.70 or less, more preferably 1.59 or more and 1.66 or less. In addition, the Abbe's number νd is preferably 16 or more and 35 or less, more preferably 17 or more and 30 or less. In addition, the anomalous dispersion characteristic θg,F is preferably 0.50 or more and 0.72 or less, more preferably 0.53 or more and 0.69 or less.

Any other monomer, oligomer, or polymer having a polymerizable functional group such as an acrylic group, a methacrylic group, a vinyl group, or an epoxy group can be added to the organic compound in the present invention as required. In addition, the other monomer, oligomer, or polymer may be free of any polymerizable functional group.

Specific examples of the other monomer, oligomer, or polymer that may be added to the organic compound include ethyl (meth)acrylate, 2-ethylhexyl (meth)acrylate, hydroxyethyl (meth)acrylate, n-butyl methacrylate, glycidyl, methacrylate, lauryl (meth)acrylate, stearyl (meth)acrylate, isobornyl (meth)acrylate, hydroxypropyl (meth)acrylate, hydroxybutyl (meth)acrylate, polyethylene glycol mono (meth)acrylate, glycerin di(meth)acrylate, trimethylolpropane di(meth)acrylate, pentaerythritol di(meth)acrylate, pentaerythritol tri(meth)acrylate, dipentaerythritol penta(meth)acrylate, bisphenol A diglycidyl ether (meth)acrylate, poly(meth)acrylate carbamate, modified epoxy acrylate, modified bisphenol A epoxy (meth)acrylate, 1,6-hexanediol adipate (meth)acrylic acid ester, phthalic anhydride propylene oxide (meth)acrylic acid ester, diethylene glycol trimellitate (meth)acrylic acid ester, rosin-modified epoxy di(meth)acrylate, alkyd-modified (meth)acrylate, and other oligomers, tripropylene glycol di(meth)acrylate, 1,6-hexanediol di(meth)acrylate, bisphenol A diglycidyl ether di(meth)acrylate, trimethylolpropane tri(meth)acrylate, pentaerythritol tri(meth)acrylate, triacrylformal, pentaerythritol tetra(meth)acrylate, dipentaerythritol hexa(meth)acrylate, and dipentaerythritol penta(meth)acrylate.

(Metal Oxide Fine Particles)

Metal oxide fine particles for forming the organic-inorganic composite resin composition of the present invention are preferably a transparent conductive substance.

Suitable examples of the transparent conductive substance include, but not limited to, tin-doped indium oxide (ITO), antimony-doped tin oxide (ATO), zinc-doped indium oxide (IZO), aluminum-doped zinc oxide (AZO), fluorine-doped tin oxide (FTO), and $SnO_2$. Composite oxide fine particles with Si, Ti, Sn, Zr, or the like may also be used as required.

The content of the metal oxide fine particles to be incorporated into the organic-inorganic composite resin composition is 10 vol. % or more and 23 vol. % or less with respect to the organic-inorganic composite resin composition in terms of a volume fraction. A content of more than 23 vol. % is responsible for increased scattering or a reduction in transmittance. In particular, when the metal oxide fine particles are a substance that undergoes coloring in a visible light region such as ITO, an influence on the transmittance becomes remarkable depending on a thickness to be used. In addition, a viscosity increases, and as a result, moldability, handleability, or material manufacturability may reduce. When a dispersant or a surface treatment agent is used in combination upon dispersion, the amount of the dispersant or the surface treatment agent increases as the amount of the metal oxide fine particles increases. Accordingly, desired optical characteristics or desired mechanical properties are hardly obtained in some cases. A content of less than 10 vol. % precludes the acquisition of optical characteristics such as a refractive index, Abbe's number, and anomalous dispersion characteristic dependent on the fine particles.

The average particle diameter of the metal oxide fine particles is desirably a particle diameter of such a size that the transmittance, the scattering, and the like are not adversely affected, and falls within the range of preferably 2 nm or more and 50 nm or less, particularly preferably 2 nm or more and 30 nm or less. However, even when the average particle diameter is, for example, 30 nm or less, in cases where a particle diameter distribution is wide and a ratio of particles each having a particle diameter of more than 30 nm to all fine particles is 5% or more in terms of a volume fraction including the case where the fine particles agglomerate, a large deteriorating effect on the scattering arises. In such cases, unnecessary large fine particles are preferably removed by performing a filtering treatment with a filter having a small pore as compared with a particle size to be removed at a material production stage.

(Polymerization Initiator)

When a polymerization initiator is incorporated into, for example, the organic compound having a polymerizable functional group, the organic-inorganic composite resin composition of the present invention can be turned into a cured product by applying active energy to polymerize the compound.

The active energy is obtained through, for example, irradiation with light such as: ultraviolet light emitted from a light source; an electron beam taken out of an electron beam accelerator typically at 20 to 2,000 kV; an active energy ray such as an α-ray, a β-ray, or a γ-ray; or an infrared ray. Examples of the light source include a xenon lamp, a low-pressure mercury lamp, a high-pressure mercury lamp, an ultrahigh-pressure mercury lamp, a metal halide lamp, a carbon-arc lamp, and a tungsten lamp. The ways of applying the active energy further include, but not limited to, heat and an ultrasonic wave.

When a radical polymerization initiator is utilized as a polymerization initiator in the case where the polymerization is performed through the photoirradiation (hereinafter, referred to as "photopolymerization initiator"), a radical production mechanism based on the photoirradiation can be utilized. The initiator is typically preferred for the molding of a replica of, for example, a lens. Examples of the photopolymerization initiator which may be utilized in the polymerizable components may include 2-benzyl-2-dimethylamino-1-(4-morpholinophenyl)-1-butanone, 1-hydroxy-cyclohexyl-phenyl ketone, 2-methyl-1-(4-methylthiophenyl)-2-morpholinopropan-1-one, bis(2,4,6-trimethylbenzoyl)-phenylphosphine oxide, 4-phenylbenzophenone, 4-phenoxybenzophenone, 4,4'-diphenylbenzophenone, and 4,4'-diphenoxybenzophenone. The photopolymerization initiator is not limited to the radical polymerization initiator, and a cationic or anionic polymerization initiator may also be used. Note that, the addition ratio of the photopolymerization initiator can be appropriately selected depending on the amount of light irradiation and additional heating, and can be adjusted depending on a target average molecular weight of a polymer to be obtained.

When the photopolymerization initiator is utilized for the curing and molding of the resin according to the present invention, its addition amount is preferably selected from the range of 0.01 wt % or more and 10.00 wt % or less with respect to a polymerizable component, though the addition amount varies depending on the kind and addition amount of the fine particles to be used. Only one kind of the photopolymerization initiators may be used, or two or more kinds thereof may be used in combination depending on reactivity with the polymerizable component and the wavelength of light to be applied.

In addition, when a radical polymerization initiator is utilized as a polymerization initiator in the case where the polymerization is performed through heating (hereinafter, referred to as "thermal polymerization initiator") as in the foregoing, a radical production mechanism based on the heating can be utilized. The initiator is typically preferred for the molding of a replica of, for example, a lens. Examples of the thermal polymerization initiator which may be utilized in the polymerizable components may include azobisisobutyronitrile (AIBN), benzoyl peroxide, t-butyl peroxypivalate, t-butyl peroxyneohexanoate, t-hexyl peroxyneohexanoate, t-butyl peroxyneodecanoate, t-hexyl peroxyneodecanoate, cumyl peroxyneohexanoate, and cumyl peroxyneodecanoate. The thermal polymerization initiator is not limited to the radical polymerization initiator, and a cationic or anionic polymerization initiator may also be used. Noted that, the addition ratio of the thermal polymerization initiator can be appropriately selected depending on a heating temperature and additional photoirradiation, and can be adjusted depending on a target polymerization degree of a molded body to be obtained.

When the thermal polymerization initiator is utilized for the curing and molding of the resin according to the present invention, its addition, amount is preferably selected from the range of 0.01 wt % or more and 10.00 wt % or less with respect to the polymerizable component, though the addition amount varies depending on the kind and addition amount of the fine particles to be used. Only one kind of the photopolymerization initiators may be used, or two or more kinds thereof may be used in combination depending on reactivity with the polymerizable component and the wavelength of light to be applied.

(Surface Treatment Agent and Dispersant)

The metal oxide fine particles in the present invention are desirably subjected to a surface treatment as required. Each surface treatment may be performed at the stage of the synthesis or production of the metal oxide fine particles, or may be separately performed after the metal oxide fine particles have been obtained.

A surface treatment agent (surfactant) or dispersant for uniformly dispersing the metal oxide fine particles in the present invention so that the fine particles may not agglomerate is desirably any one of the following substances. It has been generally known that when fine particles are dispersed in a solvent, a resin, or the like with a surface treatment agent or a dispersant, the fine particles show a completely different dispersed state depending on, for example, the kind, addition amount, molecular weight, polarity, and affinity of the surface treatment agent or dispersant to be added. A pigment derivative, a resin-type substance, or an activator-type substance can be suitably used as the surface treatment agent or dispersant to be used in the present invention. Here, as the surface treatment agent or the dispersant, a cationic, weak cationic, nonionic, or amphoteric surfactant is effective. In particular, there may be used polyester-based, polycaprolactone-based, polycarboxylic acid salt-based, polyphosphoric acid salt-based, hydroxystearic acid salt-based, amide sulfonate-based, polyacrylic acid salt-based, olefin-maleic acid salt copolymer-based, acrylic acid salt-maleic acid salt copolymer-based, alkylamine acetic acid salt-based, alkyl fatty acid salt-based, fatty acid polyethylene glycol ester-based, silicone-based, and fluorine-based surfactants. Of those, in the present invention, it is suitable to use at least one kind selected from polycaprolactone-based surfactants. Also suitable are, for example, Disperbyk 161, 162, 163, and 164 among the Disperbyk series (manufactured by BYK Japan KK), and Solsperse 3000, 9000, 17000, 20000, 24000, and 41090 among the Solsperse series (manufactured by Zeneca Inc.).

The addition amount of such surface treatment agent or dispersant varies depending mainly on, for example, the kind of the surface treatment agent or dispersant, the kind of the fine particles, the surface areas (fine particle diameters) of the fine particles, and the kind of the resin or solvent in which the fine particles are mixed. In the present invention, the addition amount is desirably 0.1 wt % or more and 30.0 wt % or less, preferably 5.0 wt % or more and 25.0 wt % or less with respect to the weight of the metal oxide fine particles. An excessively large addition amount of the dispersant is responsible for opacification and hence scattering occurs. Accordingly, the characteristics (such as the refractive index, Abbe's number, anomalous dispersion characteristic, and elastic modulus) of the final composition incorporating the fine particles are reduced to a larger extent than is necessary. In addition, only one kind of the dispersants may be used, or two or more kinds thereof may be used in combination.

(Solvent)

The solvent to be used in the organic-inorganic composite resin composition of the present invention is used for dissolving the organic compound and the polymerization initiator or for dispersing the metal oxide fine particles in the solvent, and for dissolving the surface treatment agent or the dispersant as required. Examples of the solvent include, but not limited to, aromatic hydrocarbons such as toluene, benzene, and xylene, alcohols such as ethanol and isopropanol, alicyclic hydrocarbons such as cyclohexane, acetate esters such as ethyl acetate and butyl acetate, ketones such as acetone and methyl ethyl ketone, amide-based substances such as DMF, DMAc, and NMP, aliphatic hydrocarbons such as hexane and octane, ethers such as diethyl ether and butyl carbitol, and halogenated hydrocarbons such as dichloromethane and carbon tetrachloride. A dispersion solvent can be selected in accordance with the solubility of each of the organic compound and the polymerization initiator to be used, the affinity of the metal oxide fine particles, and the affinity of the surface treatment agent or the dispersant. In addition, only one kind of organic solvents may be used, or two or more kinds thereof may be used in combination to such an extent that the solubility and the dispersion characteristic of the fine particles are not impaired.

Next, an organic-inorganic composite resin material of the present invention is characterized by being made of a cured product of the organic-inorganic composite resin composition.

Hereinafter, production steps for the organic-inorganic composite resin material in the present invention are described.

A method of producing the cured product of the organic-inorganic composite resin composition according to the present invention with a photopolymerization mechanism is described.

First, a proper amount of the surface treatment agent or the dispersant is dissolved in the solvent. Next, desired metal oxide fine particles are added and subjected to a dispersion treatment by various methods. Thus, such slurry that the metal oxide fine particles are uniformly dispersed in the solvent is obtained. The slurry can be prepared with a dispersing machine such as an ultrasonic mill, a sand mill, a jet mill, a disk mill, or a bead mill in the dispersion treatment. Such slurry that scattering occurs to an extremely low degree can be produced by performing the treatment particularly with a bead mill dispersion treatment apparatus out of the dispersion treatment approaches. Although media made of various materials such as silica, alumina, and zirconia can be used as media to be used in a bead mill treatment, media made of zirconia are preferred in terms of hardness. Media of such sizes that their average particle diameter is 10 µm to 500 µm can be used. The particle diameters of the media can be adjusted depending on the average particle diameter and dispersion degree of the metal oxide fine particles to be dispersed, and media of such sizes that their average particle diameter is 10 µm to 100 µm can be more preferably used.

Next, the organic compound, the polymerization initiator, and the like are dissolved in the resultant slurry. A release agent, a sensitizer, an antioxidant, a stabilizer, a thickener, or the like may be simultaneously incorporated as required. At that time, the combination of the solvent, the surface treatment agent, the dispersant is desirably such that the deterioration of the dispersed state of the metal oxide fine particles is additionally suppressed. In addition, agglomerated fine particles can be removed by performing a filtering treatment as required. After it has been confirmed that the precipitation or the like of the metal oxide fine particles is not occurring and the fine particles are suitably dispersed, the solvent is removed with an evaporator or the like. Thus, the organic-inorganic composite resin composition before curing can be obtained.

It is desired that upon removal of the solvent, a decompression degree and a heating temperature be appropriately adjusted depending on, for example, the boiling point of the solvent and the amount of the remaining solvent. When the decompression degree is excessively high, the decompression simultaneously involves excessive heating, or a decompression step is performed over a long time period, the surface treatment agent or the dispersant added together with the solvent and any other added component may also be removed by distillation. Accordingly, the decompression degree, the temperature, the time, and the like must be adjusted in consideration of, for example, the molecular weight, boiling point, and sublimation property of each substance. In addition, abrupt evaporation or removal of the solvent may exacerbate the degree of the agglomeration of the fine particles to impair their dispersion characteristic.

In addition, the organic-inorganic composite resin composition before curing obtained in the foregoing may contain the remaining solvent that was unable to be completely removed. The solvent is considered to affect durability and optical characteristics in, for example, a subsequent molded article depending on its content. Accordingly, the content of the remaining solvent desirably falls within the range of 0.01 wt % to 0.50 wt % with respect to the total weight.

Next, the organic-inorganic composite resin composition is cured by applying active energy so as to obtain an organic-inorganic composite resin material made of the cured product.

As a specific example, there is described a process of obtaining a cured product by forming a molded compact layer using polymerization mechanism by light irradiation in manufacturing of the diffraction optical element according to the present invention.

When a layer structure of thin film is formed on a transparent material used as a substrate, a glass flat plate is used as a substrate for example, and a metal material is used as a mold corresponding to a fine diffraction grating structure. The organic-inorganic composite resin composition before being cured is disposed between the both materials, and a pressure is applied so that the resin is filled in the mold shape and model forming is performed. In this state, light irradiation is performed for polymerization. After that, the resin is released from the mold and hence the diffraction optical element made of the cured organic-inorganic composite resin material is obtained.

The light irradiation for such an optical polymerization reaction is performed using suitable wavelength light, usually, ultraviolet light or visible light corresponding to a mechanism due to radical formation using an optical polymerization initiator. For instance, uniform light irradiation is performed for the filled resin via the glass substrate used as the above-mentioned substrate. The irradiating light intensity is selected appropriately depending on the mechanism due to the radical formation using the optical polymerization initiator, or depending on a percentage of the contained optical polymerization initiator.

On the other hand, when the molded compact layer is manufactured by the optical polymerization reaction, it is preferred that the light uniformly irradiate the filled resin composition. Therefore, in the light irradiation to be used, it is further preferred to select light having a wavelength that enables uniform irradiation through the glass substrate. In addition, it is preferred to set a small total thickness of the diffraction grating including the molded compact layer formed on the transparent material used as the substrate.

Similarly, it is also possible to form the molded compact layer using a heating polymerization mechanism. In this case, it is preferred to set the temperature to be more uniform over the entire area and to set a small total thickness of the diffraction grating including the molded compact layer formed on the transparent material used as the substrate.

Therefore, utilizing the above-mentioned method using the organic-inorganic composite resin composition according to the present invention, multiple layers made of materials having different refractive index dispersion characteristics can be stacked on the substrate. Thus, it is possible to manufacture a diffraction optical element designed to have high diffraction efficiency of a predetermined order (design order) in the entire wavelength region to be used, in short time.

The optical element of the present invention has a feature of including a transparent substrate, and the above-mentioned organic-inorganic composite resin material formed on the transparent substrate. It is preferred that a surface of the organic-inorganic composite resin material be the diffracting surface on which the diffraction shape is formed.

The stacked diffraction optical element of the present invention includes a first diffraction optical element that is made of the above-mentioned organic-inorganic composite resin material, and has a diffracting surface having a diffraction shape as one surface, and a second diffraction optical element that is made of glass having a larger refractive index and a larger Abbe's number than those of the first diffraction optical element, and has a diffracting surface having a diffraction shape as one surface. The first diffraction optical element and the second diffraction optical element have a feature that the diffracting surfaces thereof are opposed to each other and are in close contact with each other.

The first diffraction optical element is made of the organic-inorganic composite resin material of the present invention. It is preferred that the first diffraction optical element has a refractive index nd of 1.61 or more and 1.65 or less, Abbe's number vd of 13 or more and 20 or less, and an anomalous dispersion characteristic $\theta g,F$ of 0.42 or more and 0.54 or less.

The second diffraction optical element is made of glass. As the glass, M-NBF1 manufactured by HOYA Corporation is used, for example. It is preferred that the second diffraction optical element have a refractive index nd of 1.70 or more and 1.75 or less, Abbe's number vd of 40 or more and 55 or less, and an anomalous dispersion characteristic $\theta g,F$ of 0.53 or more and 0.58 or less.

A typical general structure of the stacked diffraction optical element of the present invention is described with reference to FIG. 1.

FIG. 1 is a schematic diagram of a stacked diffraction optical element 101 according to the present invention. The upper part of FIG. 1 illustrates a top view, and the lower part of FIG. 1 illustrates a cross sectional view. This stacked diffraction optical element has a structure in which a high-refractive index low-dispersion characteristic layer 102 made of glass having a diffraction grating shape and a low-refractive index high-dispersion characteristic layer 103 made of the organic-inorganic composite resin material according to the present invention are stacked without a space therebetween. Note that, the stacking order of the high-refractive index low-dispersion characteristic layer 102 and the low-refractive index high-dispersion characteristic layer 103 may be reversed. In addition, each side of each of the high-refractive index low-dispersion characteristic layer 102 and the low-refractive index high-dispersion characteristic layer 103 may be a flat surface, a spherical shape, or an aspheric shape. In addition, the low-refractive index high-dispersion characteristic layer 103 may be sandwiched between transparent substrate layers made of glass, plastic material, or the like.

The grating height is denoted by d, and the grating height is preferably 7.0 μm or less.

The organic-inorganic composite resin material of the present invention is used as an optical material. The stacked diffraction optical element of the present invention includes one diffraction optical element and the other diffraction optical element having a lower refractive index and a higher refractive index dispersion characteristic than those of the one diffraction optical element. Therefore, the stacked diffraction optical element including the other diffraction optical element made of the organic-inorganic composite resin material and the corresponding one diffraction optical element can efficiently remove chromatic aberration and can achieve small size and light weight. The diffraction efficiency of the obtained optical element is extremely high, and the grating height thereof can be designed to be small. Therefore, the amount of generated flare depending on the grating height can be small.

In addition, the organic-inorganic composite resin composition of the present invention contains the polymerization initiator as a composition of material, and hence various types of active energy can be used for curing to obtain the cured product. Thus, high processability can be obtained. Therefore, an optical element having a desired shape can be manufactured efficiently at low cost. If a mold is used for transferring the shape in manufacturing, the organic-inorganic composite resin composition of the present invention is an optimal material.

EXAMPLES

Hereinafter, suitable examples of the present invention are described. However, the present invention is by no means limited by these examples.

Examples of stacked diffraction optical elements formed of constructions illustrated in FIG. 1 and FIG. 3 are described.

[Production of Low-Refractive Index High-Dispersion Material Constituting Low-Refractive Index High-Dispersion Layer 103]

Low-refractive index high-dispersion materials A1 to A15 each serving as the organic-inorganic composite resin composition according to the present invention were produced as described below.

First, 2.87 g of polycaprolactone as a dispersant were dissolved in 126.28 g of a xylene solvent. Subsequently, 14.35 g of ITO fine particles having an average particle diameter of 15 nm as metal oxide fine particles were added. Thus, a xylene solution in which the dispersant and the ITO fine particles were mixed was obtained. The resultant xylene solution was subjected to a bead mill dispersion treatment with beads made of zirconia having an average particle diameter of 30 nm, and was then subjected to a filtering treatment with a filter having a pore diameter of 100 nm. Thus, such slurry that the ITO fine particles were dispersed at 10 wt % in the xylene solvent was obtained.

Subsequently, 6.1 g of a UV-curable resin HV153 (manufactured by ADELL CORPORATION) (after curing, refractive index nd=1.63, νd=25, θg,F=0.65) as a mixture of a photopolymerization initiator and an organic compound were mixed in the slurry. The mixed solution was charged into an evaporator, and then a pressure was gradually reduced from 100 hPa at 45° C. so that the final pressure was 3 hPa. The xylene solvent was sufficiently removed over 12 hours. Thus, the low-refractive index high-dispersion material A1 was produced.

The low-refractive index high-dispersion materials A2 to A5 were each produced by the same method as that described above by changing the addition amount of the ITO fine particles as the metal oxide fine particles.

Noted that, the average particle diameter was measured with a laser-type particle size distribution meter (ELS: manufactured by Otsuka Electronics Co., Ltd.).

In addition, the low-refractive index high-dispersion materials A6 and A7 were each produced by the same method as that described above with a UV-curable resin UV1000 (manufactured by Mitsubishi Chemical Corporation) (after curing, refractive index nd=1.63, νd=23, θg,F=0.68) instead of the UV-curable resin HV153.

In addition, the low-refractive index high-dispersion materials A8 to A12 were each produced by the same method as that described above with a UV-curable resin (after curing, refractive index nd=1.63, νd=25, θg,F=0.62) obtained by adding 3 wt % of 1-hydroxy-cyclohexyl-phenyl ketone as a photopolymerization initiator to an EA-0200 (manufactured by Mitsubishi Gas Chemical Company, Inc.) instead of the UV-curable resin HV153.

In addition, the low-refractive index high-dispersion materials A13 to A15 were each produced by the same method as that described above with a UV-curable resin (after curing, refractive index nd=1.61, νd=27, θg,F=0.62) obtained by adding 3 wt % of 1-hydroxy-cyclohexyl-phenyl ketone as a photopolymerization initiator to an EA-F5503 (manufactured by Mitsubishi Gas Chemical Company, Inc.) instead of the UV-curable resin HV153.

Table 1 shows the kinds of the organic compound and metal oxide fine particles of each of the low-refractive index high-dispersion materials A1 to A15, and the volume fraction of the metal oxide fine particles in each low-refractive index high-dispersion material.

[High-Refractive Index Low-Dispersion Material Constituting High-Refractive Index Low-Dispersion Layer 102]

When the stacked diffraction optical element was manufactured, glass materials (manufactured by HOYA Corporation) of Table 2 were used as the high-refractive index low-dispersion materials B1 to B5 constituting the high-refractive index low-dispersion layer 102.

Table 2 shows glass types of the high-refractive index low-dispersion materials B1 to B5.

[Process of Low-Refractive Index High-Dispersion Material Constituting Low-Refractive Index High-Dispersion Layer 204]

The low-refractive index high-dispersion materials C1 to C3 were produced based on U.S. Pat. No. 7,663,803 and Japanese Patent Application Laid-Open No. 2009-197217.

The manufacturing methods were carried out by appropriately changing the ratio of the metal oxide fine particles to the organic compound.

Note that, C1 had high viscosity while solvent was being removed, presumably because of large volume fraction of the fine particles, and hence the solvent could not be removed completely.

Table 3 shows the kinds of the organic compound and metal oxide fine particles of each of the low-refractive index high-dispersion materials C1 to C3, and the volume fraction of the metal oxide fine particles in each low-refractive index high-dispersion material.

[Process of High-Refractive Index Low-Dispersion Material Constituting High-Refractive Index Low-Dispersion Layer 203]

The high-refractive index low-dispersion materials D1 to D3 were produced based on U.S. Pat. No. 7,663,803 and Japanese Patent Application Laid-Open No. 2009-197217. The manufacturing methods were carried out by appropriately changing the ratio of the metal oxide fine particles to the organic compound.

Table 4 shows the kinds of the organic compound and metal oxide fine particles of each of the high-refractive index low-dispersion materials D1 to D3, and the volume fraction of the metal oxide fine particles in each high-refractive index low-dispersion material.

[Evaluation of Refractive Index Characteristics]

Next, a method of evaluating refractive index characteristics of the low-refractive index high-dispersion materials A1 to A15, the high-refractive index low-dispersion materials B1 to B5, the low-refractive index high-dispersion materials C1 to C3, and the high-refractive index low-dispersion materials D1 to D3 is described.

The refractive index characteristics of the low-refractive index high-dispersion materials A1 to A15, the low-refractive index high-dispersion materials C1 to C3, and the high-refractive index low-dispersion materials D1 to D3 were measured by manufacturing samples as follows.

Figure 4A:
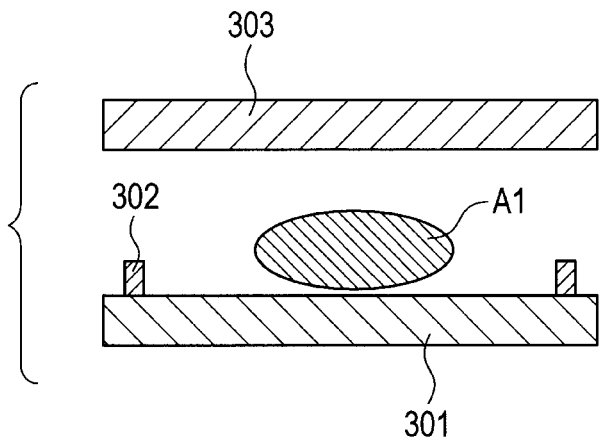
FIG. 4A is a schematic diagram illustrating a manufacturing method of an evaluation sample of the refractive index.
Figure 4B:
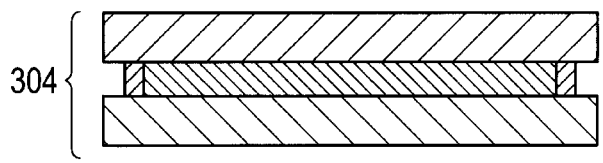
FIG. 4B is a schematic diagram illustrating a manufacturing method of an evaluation sample of the refractive index.
Figure 4C:
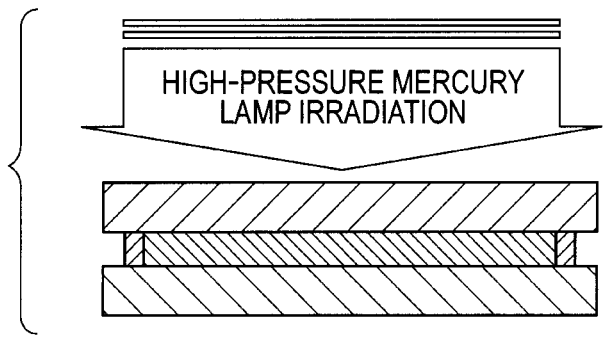
FIG. 4C is a schematic diagram illustrating a manufacturing method of an evaluation sample of the refractive index.
Figure 4D:
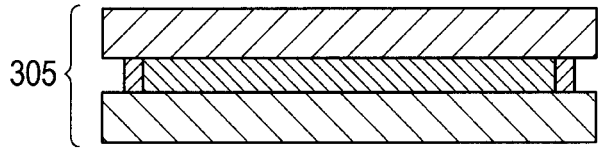
FIG. 4D is a schematic diagram illustrating a manufacturing method of an evaluation sample of the refractive index.

First, as illustrated in FIGS. 4A to 4D, spacers 302 having a thickness of 10 μm and the material produced by the above-mentioned method, for example, the low-refractive index high-dispersion material A1 were disposed on high refractive index glass 301 having a thickness of 1 mm (FIG. 4A). On the material, synthetic quartz glass 303 having a thickness of 1 mm was disposed via the spacers 302, and hence the low-refractive index high-dispersion material A1 was pressed and spread out to be a sample (before cured) 304 (FIG. 4B). This sample (before cured) 304 for evaluating the refractive index was irradiated with light from a high-pressure mercury lamp (EXECURE 250, HOYA CANDEO OPTRONICS CORPORATION) under the condition of 20 mW/cm$^2$ and 1000 seconds, and hence the low-refractive index high-dispersion material A1 was cured (FIG. 4C). Thus, a sample (after cured) 305 for measuring the refractive index was obtained (FIG. 4D).

As for the sample (after cured) 305 for measuring the refractive index, refractive indexes on the g-line at 435.8 nm, the F-line at 486.1 nm, the e-line at 546.1 nm, the d-line at 587.6 nm, and the C-line at 656.3 nm were measured by using a refractometer (KPR-30, SHIMADZU CORPORATION). In addition, the Abbe's number νd and the anomalous dispersion characteristic θg,F were calculated from the measured refractive indexes. Note that, the evaluation of the refractive index characteristic was performed in an environment of 23° C.

Tables 1, 3, and 4 show the refractive index nd, the Abbe's number, and the anomalous dispersion characteristic θg,F as refractive index characteristics of the low-refractive index high-dispersion materials A1 to A15 and C1 to C3, and the high-refractive index low-dispersion materials D1 to D3.

As for the high-refractive index low-dispersion materials B1 to B5, a block of 1 cm square was manufactured by cutting and polishing process to be a sample, and measurement and calculation of the refractive index was performed in the same manner as described above.

Table 2 shows the refractive index nd, the Abbe's number, and the anomalous dispersion characteristic θg,F as the refractive index characteristics of the high-refractive index low-dispersion materials B1 to B5.

TABLE 1

| | Organic compound Type | Metal oxide fine particle Type | Volume fraction (vol %) | Refractive index nd | Abbe's number vd | Anomalous dispersion characteristic θg, F. |
|---|---|---|---|---|---|---|
| Low-refractive index high-dispersion material A1 | HV153 | ITO | 22.0 | 1.632 | 14.4 | 0.44 |
| Low-refractive index high-dispersion material A2 | | | 20.7 | 1.632 | 14.7 | 0.45 |
| Low-refractive index high-dispersion material A3 | | | 17.9 | 1.631 | 15.6 | 0.47 |
| Low-refractive index high-dispersion material A4 | | | 12.3 | 1.630 | 17.7 | 0.51 |
| Low-refractive index high-dispersion material A5 | | | 10.8 | 1.629 | 18.3 | 0.52 |
| Low-refractive index high-dispersion material A6 | UV1000 | | 17.8 | 1.634 | 15.2 | 0.49 |
| Low-refractive index high-dispersion material A7 | | | 16.6 | 1.634 | 15.6 | 0.50 |
| Low-refractive index high-dispersion material A8 | EA-0200 | | 22.3 | 1.633 | 14.3 | 0.43 |
| Low-refractive index high-dispersion material A9 | | | 21.0 | 1.633 | 14.6 | 0.44 |
| Low-refractive index high-dispersion material A10 | | | 18.2 | 1.632 | 15.5 | 0.45 |
| Low-refractive index high-dispersion material A11 | | | 12.6 | 1.631 | 17.5 | 0.49 |

TABLE 1-continued

|  | Organic compound Type | Metal oxide fine particle Type | Volume fraction (vol %) | Refractive index nd | Abbe's number vd | Anomalous dispersion characteristic θg, F. |
|---|---|---|---|---|---|---|
| Low-refractive index high-dispersion material A12 |  |  | 11.1 | 1.630 | 18.1 | 0.50 |
| Low-refractive index high-dispersion material A13 | EA-F5503 |  | 22.2 | 1.627 | 14.4 | 0.43 |
| Low-refractive index high-dispersion material A14 |  |  | 18.0 | 1.624 | 15.9 | 0.45 |
| Low-refractive index high-dispersion material A15 |  |  | 16.8 | 1.623 | 16.3 | 0.46 |

TABLE 2

|  | Glass Type | Refractive index nd | Abbe's number vd | Anomalous dispersion characteristic θg, F |
|---|---|---|---|---|
| High-refractive index low-dispersion material B1 | M-LAF81 | 1.731 | 40.5 | 0.57 |
| High-refractive index low-dispersion material B2 | M-NBF1 | 1.743 | 49.3 | 0.55 |
| High-refractive index low-dispersion material B3 | TAC2 | 1.741 | 52.6 | 0.54 |
| High-refractive index low-dispersion material B4 | TAC8 | 1.729 | 54.7 | 0.54 |
| High-refractive index low-dispersion material B5 | LAC10 | 1.720 | 50.4 | 0.55 |

TABLE 3

|  | Organic compound Type | Metal oxide fine particle Type | Volume fraction (vol %) | Refractive index nd | Abbe's number vd | Anomalous dispersion characteristic θg, F. |
|---|---|---|---|---|---|---|
| Low-refractive index high-dispersion material C1 | UV-curable fluorine resin | ITO | 24.5 | Cannot measure because solvent cannot be completely removed | | |
| Low-refractive index high-dispersion material C2 |  |  | 22.9 | 1.534 | 14.3 | 0.37 |
| Low-refractive index high-dispersion material C3 |  |  | 16.2 | 1.503 | 17.4 | 0.39 |

TABLE 4

|  | Organic compound Type | Metal oxide fine particle Type | Volume fraction (vol %) | Refractive index nd | Abbe's number vd | Anomalous dispersion characteristic θg, F. |
|---|---|---|---|---|---|---|
| High-refractive index low-dispersion material D1 | UV-curable acrylic resin | ZrO$_2$ | 20.6 | 1.625 | 44.1 | 0.57 |
| High-refractive index low-dispersion material D2 |  |  | 17.9 | 1.612 | 44.6 | 0.57 |
| High-refractive index low-dispersion material D3 |  |  | 6.2 | 1.559 | 47.2 | 0.57 |

[Stacked Diffraction Optical Element 101]

With use of the low-refractive index high-dispersion materials A1 to A15 and the high-refractive index low-dispersion materials B1 to B5, the stacked diffraction optical element having the structure illustrated in FIG. 1 was manufactured.

The stacked diffraction optical element was manufactured by the method illustrated in FIGS. 5A to 5E. Example 1 is the stacked diffraction optical element using the low-refractive index high-dispersion material A1 and the high-refractive index low-dispersion material B1.

Figure 5A:
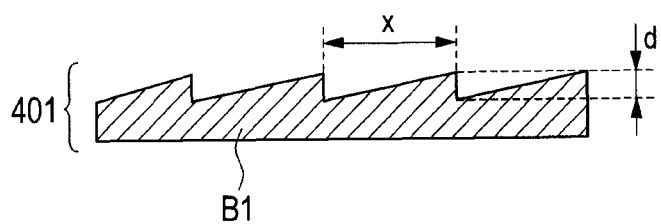
FIG. 5A is a schematic diagram illustrating a manufacturing method of a stacked diffraction optical element according to the present invention.

First, the diffraction grating was formed on the high-refractive index low-dispersion material B1 by the cutting and polishing process to have a grating height (d) of 6.0 μm, a pitch width (x) of 200 μm, and a surface roughness Ra of 2 nm (FIG. 5A). The diffraction grating was formed by the cutting and polishing process in this example, but the diffraction grating may be formed by glass mold forming depending on a type of the glass.

Figure 5B:
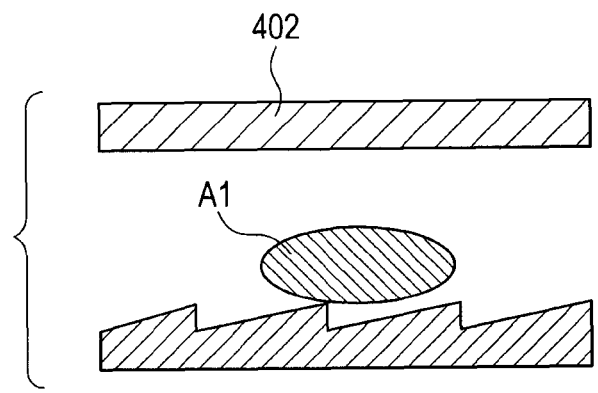
FIG. 5B is a schematic diagram illustrating a manufacturing method of a stacked diffraction optical element according to the present invention.
Figure 5C:
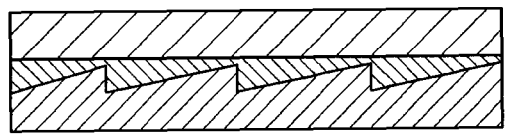
FIG. 5C is a schematic diagram illustrating a manufacturing method of a stacked diffraction optical element according to the present invention.
Figure 5D:
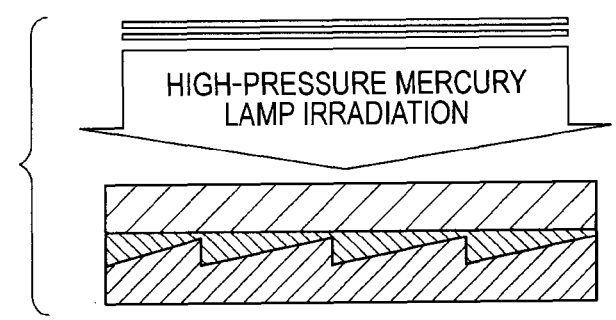
FIG. 5D is a schematic diagram illustrating a manufacturing method of a stacked diffraction optical element according to the present invention.
Figure 5E:
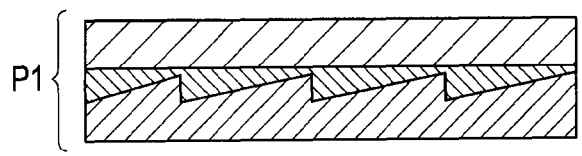
FIG. 5E is a schematic diagram illustrating a manufacturing method of a stacked diffraction optical element according to the present invention.

The low-refractive index high-dispersion material A1 was placed on the diffraction grating surface of the obtained diffraction optical element 401 (FIG. 5B). On the low-refractive index high-dispersion material A1, a transparent substrate 402 was placed so as to press and spread the low-refractive index high-dispersion material A1 (FIG. 5C). Next, through the transparent substrate 402, light irradiated from the high-pressure mercury lamp (EXECURE 250, HOYA CANDEO OPTRONICS CORPORATION) under the condition of 20 mW/cm$^2$ and 1000 seconds, and hence the low-refractive index high-dispersion material A1 was cured (FIG. 5D). Thus, a stacked diffraction optical element P1 made of the low-refractive index high-dispersion material A1 and the high-refractive index low-dispersion material B1 was obtained (FIG. 5E).

In the same manner, other stacked diffraction optical elements P2 to P15 were also manufactured.

Table 5 shows combinations of the low-refractive index high-dispersion materials and the high-refractive index low-dispersion materials, and shapes of diffraction gratings of the stacked diffraction optical elements P1 to P15 (the grating heights and the pitch widths), according to Examples 1 to 15.

With use of a noncontact three-dimensional surface shape and roughness measuring instrument (New View 5000, ZygoKK), the grating height of the obtained diffraction optical element was measured. As a result, it was confirmed that the grating height was formed as designed.

[Stacked Diffraction Optical Element 201]

The stacked diffraction optical element having the structure illustrated in FIG. 3 was manufactured with use of the low-refractive index high-dispersion materials C1 to C3 and the high-refractive index low-dispersion materials D1 to D3.

The stacked diffraction optical element was manufactured based on U.S. Pat. No. 7,663,803 and Japanese Patent Application Laid-Open No. 2009-197217.

Comparative Example 1 is the stacked diffraction optical element using the low-refractive index high-dispersion material C1 and the high-refractive index low-dispersion material D1. Thus, the stacked diffraction optical element S1 using the low-refractive index high-dispersion material C1 and the high-refractive index low-dispersion material D1 was obtained.

In the same manner, other stacked diffraction optical elements S2 and S3 were manufactured.

Table 5 shows combinations of the low-refractive index high-dispersion materials and the high-refractive index low-dispersion materials, and shapes of diffraction gratings of the stacked diffraction optical elements S1 to S3 (the grating heights and the pitch widths), according to Comparative Examples 1 to 3.

[Evaluation of Diffraction Efficiency]

Diffraction efficiencies of the stacked diffraction optical elements P1 to P15 and S1 to S3 were measured. The diffraction efficiency is a transmittance under irradiation with light intensity of the design order of the diffraction grating of the stacked diffraction optical element. The results are shown in Table 5. Symbol ○ in Table 5 indicates that the diffraction efficiency is 99% or more in a wavelength range of 400 to 700 nm. The evaluation of the diffraction efficiency was performed in the environment of 23° C.

TABLE 5

| | Low-refractive index high-dispersion material | High-refractive index low-dispersion material | Diffraction optical element | Shape of diffraction grating | | Diffraction efficiency |
|---|---|---|---|---|---|---|
| | | | | Grating height (μm) | Pitch width (μm) | |
| Example 1 | Low-refractive index high-dispersion material A1 | High-refractive index low-dispersion material B1 | Stacked diffraction optical element P1 | 6.0 ○ | 200 | ○ |
| Example 2 | Low-refractive index high-dispersion material A2 | High-refractive index low-dispersion material B2 | Stacked diffraction optical element P2 | 5.3 ○ | 200 | ○ |
| Example 3 | Low-refractive index high-dispersion material A3 | High-refractive index low-dispersion material B3 | Stacked diffraction optical element P3 | 5.4 ○ | 200 | ○ |
| Example 4 | Low-refractive index high-dispersion material A4 | High-refractive index low-dispersion material B4 | Stacked diffraction optical element P4 | 6.0 ○ | 200 | ○ |
| Example 5 | Low-refractive index high-dispersion material A5 | High-refractive index low-dispersion material B5 | Stacked diffraction optical element P5 | 6.6 ○ | 200 | ○ |
| Example 6 | Low-refractive index high-dispersion material A6 | High-refractive index low-dispersion material B1 | Stacked diffraction optical element P6 | 6.2 ○ | 200 | ○ |
| Example 7 | Low-refractive index high-dispersion material A7 | High-refractive index low-dispersion material B2 | Stacked diffraction optical element P7 | 5.5 ○ | 200 | ○ |
| Example 8 | Low-refractive index high-dispersion material A8 | High-refractive index low-dispersion material B1 | Stacked diffraction optical element P8 | 6.0 ○ | 200 | ○ |
| Example 9 | Low-refractive index high-dispersion material A9 | High-refractive index low-dispersion material B2 | Stacked diffraction optical element P9 | 5.4 ○ | 200 | ○ |
| Example 10 | Low-refractive index high-dispersion material A10 | High-refractive index low-dispersion material B3 | Stacked diffraction optical element P10 | 5.5 ○ | 200 | ○ |
| Example 11 | Low-refractive index high-dispersion material A11 | High-refractive index low-dispersion material B4 | Stacked diffraction optical element P11 | 6.1 ○ | 200 | ○ |
| Example 12 | Low-refractive index high-dispersion material A12 | High-refractive index low-dispersion material B5 | Stacked diffraction optical element P12 | 6.6 ○ | 200 | ○ |
| Example 13 | Low-refractive index high-dispersion material A13 | High-refractive index low-dispersion material B3 | Stacked diffraction optical element P13 | 5.2 ○ | 200 | ○ |
| Example 14 | Low-refractive index high-dispersion material A14 | High-refractive index low-dispersion material B4 | Stacked diffraction optical element P14 | 5.6 ○ | 200 | ○ |
| Example 15 | Low-refractive index high-dispersion material A15 | High-refractive index low-dispersion material B5 | Stacked diffraction optical element P15 | 6.1 ○ | 200 | ○ |
| Comparative Example 1 | Low-refractive index high-dispersion material C1 | High-refractive index low-dispersion material D1 | Stacked diffraction optical element S1 | | | |
| Comparative Example 2 | Low-refractive index high-dispersion material C2 | High-refractive index low-dispersion material D2 | Stacked diffraction optical element S2 | 7.4 x | 201 | ○ |
| Comparative Example 3 | Low-refractive index high-dispersion material C3 | High-refractive index low-dispersion material D3 | Stacked diffraction optical element S3 | 10.3 x | 200 | ○ |

[Evaluation Result]

Examples 1 to 15

As understood from Tables 1 and 5, the cured product of the low-refractive index high-dispersion materials A1 to A15 used in Examples 1 to 15 has the refractive index nd of 1.61 or more and 1.65 or less, the Abbe's number νd of 13 or more and 20 or less, and the anomalous dispersion characteristic θg,F of 0.42 or more and 0.54 or less. In addition, the volume fraction of the fine particles of the low-refractive index high-dispersion material was 10 vol % or more and 23 vol % or less.

As shown in Table 5, the diffraction efficiencies of the stacked diffraction optical elements P1 to P15 manufactured by combining each of the low-refractive index high-dispersion materials A1 to A15 shown in Table 0.1 and each of the high-refractive index low-dispersion materials B1 to B5 shown in Table 2 were all as good as 99% or more in a wavelength range of 400 to 700 nm of the visible light region. Further, in this case, the grating heights are all μm or less so that the amount of generated flare depending on the grating height is very small and good.

Figure 6:
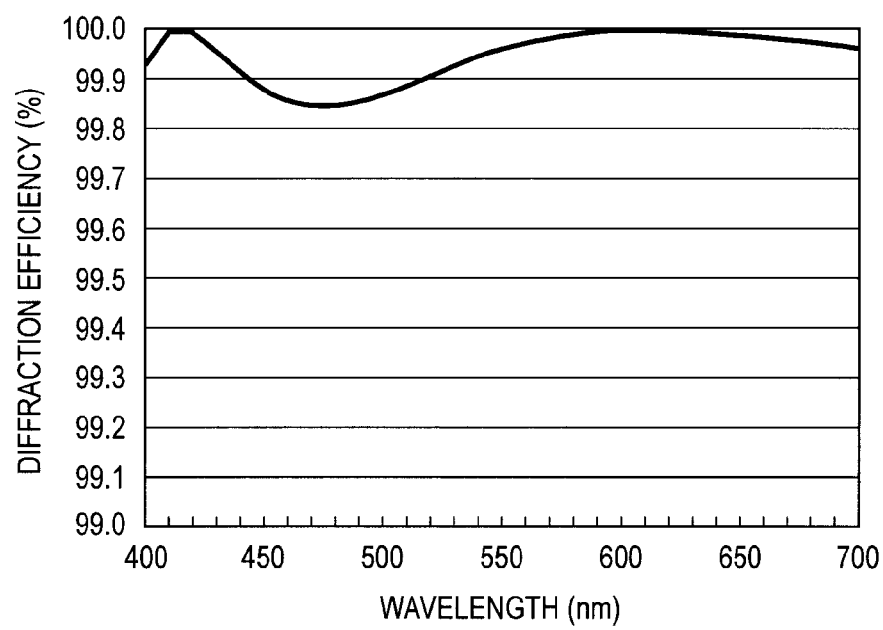
FIG. 6 is a graph illustrating diffraction efficiency of a stacked diffraction optical element (P1) according to Example 1.

FIG. 6 is a graph illustrating the diffraction efficiencies at wavelengths of the stacked diffraction optical element P1 of Example 1.

Comparative Examples 1 to 3

The low-refractive index high-dispersion material C1 had high viscosity while solvent was removed, presumably because of large volume fraction of the fine particles, and hence the solvent could not removed completely. Therefore, the refractive index characteristic of the low-refractive index high-dispersion material C1 could not evaluated, and the diffraction optical element using the low-refractive index high-dispersion material C1 could not manufactured.

As understood from Tables 3 and 5, the refractive indexes nd of the cured products of the low-refractive index high-dispersion materials C2 and C3 used for Comparative Examples 2 and 3 were in the range from 1.50 to 1.54, which were smaller than those of the low-refractive index high-dispersion materials A1 to A15 used in Examples 1 to 15. In addition, the volume fractions of the fine particles of the low-refractive index high-dispersion materials C2 to C3 were in the range from 16.2 vol % to 22.9 vol %.

As shown in Table 5, the diffraction efficiencies of the stacked diffraction optical elements S2 and S3 manufactured by combining each of the low-refractive index high-dispersion materials C2 and C3 shown in Table 3 and each of the high-refractive index low-dispersion materials D2 and D3 shown in Table 4 were all as good as 99% or more in the visible light region. However, in this case, the grating heights all exceeded 7 μm. In other words, each of the grating heights is higher than that of the stacked diffraction optical element of this example, and as a result, the amount of flare is also larger.

Figure 7:
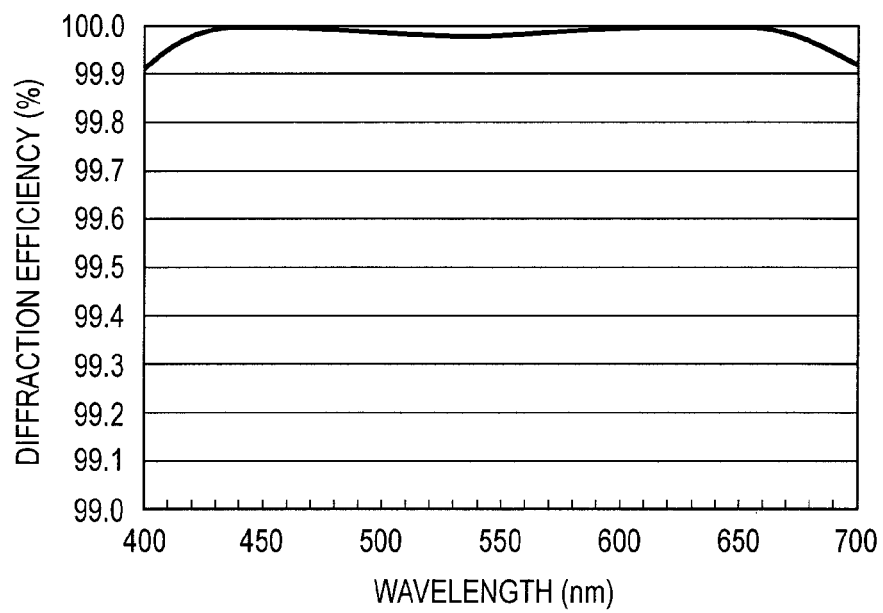
FIG. 7 is a graph illustrating diffraction efficiency of a stacked diffraction optical element (S2) according to Comparative Example 2.

FIG. 7 is a graph illustrating the diffraction efficiencies at wavelengths of the stacked diffraction optical element S2 of Comparative Example 2.

While the present invention has been described with reference to exemplary embodiments, it is to be understood that the invention is not limited to the disclosed exemplary embodiments'. The scope of the following claims is to be accorded the broadest interpretation so as to encompass all such modifications and equivalent structures and functions.

This application claims the benefit of Japanese Patent Application No. 2011-021741, filed Feb. 3, 2011, which is hereby incorporated by reference herein in its entirety.

What is claimed is:

1. A stacked diffraction optical element, comprising:
a first diffraction optical element that is made of an organic-inorganic composite resin material, and has one surface thereof being a diffracting surface having a diffraction shape; and
a second diffraction optical element that has one surface thereof being a diffracting surface having a diffraction shape,
wherein the first diffraction optical element and the second diffraction optical element are disposed so that the diffracting surfaces thereof are opposed to each other and are in contact with each other,
wherein the organic-inorganic composite resin material comprises metal oxide fine particles and a resin, which is a cured product of a polymerizable organic compound,
wherein the first diffraction optical element has a refractive index (nd) of 1.61 to 1.65, an Abbe's number (νd) of 13 to 20, and an anomalous dispersion characteristic (θg,F) of 0.42 to 0.54,
wherein the second diffraction optical element has a refractive index (nd) of 1.70 to 1.75, an Abbe's number (νd) of 40 to 55, and an anomalous dispersion characteristic (θg,F) of 0.53 to 0.58.

2. The stacked diffraction optical element according to claim 1, wherein the second diffraction optical element is made of glass.

3. The stacked diffraction optical element according to claim 1, wherein the first diffraction optical element has a grating height of 7.0 μm or less.

4. The stacked diffraction optical element according to claim 1, wherein the metal oxide fine particles comprise a transparent conductive substance.

5. The stacked diffraction optical element according to claim 4, wherein the transparent conductive substance is selected from the group consisting of tin-doped indium oxide (ITO), antimony-doped tin oxide (ATO), zinc-doped indium oxide (IZO), aluminum-doped zinc oxide (AZO), fluorine-doped tin oxide (FTO), and $SnO_2$.

6. The stacked diffraction optical element according to claim 1, wherein a content of the metal oxide fine particles is from 10 vol. % to 23 vol. % with respect to the organic-inorganic composite resin material in terms of a volume fraction.

7. The stacked diffraction optical element according to claim 1, wherein the metal oxide fine particles have an average particle diameter of 2 nm to 50 nm.

* * * * *